(12) United States Patent
Kustosch et al.

(10) Patent No.: US 7,493,981 B2
(45) Date of Patent: Feb. 24, 2009

(54) METHOD AND ARRANGEMENT FOR THE SPEED CONTROL OF A MOTOR VEHICLE AND OPERATOR-CONTROLLED ELEMENT

(75) Inventors: Mario Kustosch, Markgroeningen (DE); Christian Muehlbauer, Ludwigsburg (DE); Michael Glora, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 10/429,040

(22) Filed: May 5, 2003

(65) Prior Publication Data
US 2003/0209376 A1 Nov. 13, 2003

(30) Foreign Application Priority Data
May 3, 2002 (DE) ................. 102 19 800

(51) Int. Cl.
*B60K 31/00* (2006.01)
(52) U.S. Cl. ........................... 180/170; 701/93
(58) Field of Classification Search ............ 180/170, 180/179, 315; 74/491, 503, 504, 523; 701/93
See application file for complete search history.

(56) References Cited

U.S. PATENT DOCUMENTS

| | | | |
|---|---|---|---|
| 2,668,218 A | 2/1954 | Searle | |
| 3,116,807 A * | 1/1964 | Wilson | 180/179 |
| 3,251,312 A * | 5/1966 | Livingston | 105/61 |
| 3,365,975 A * | 1/1968 | Hathaway | 74/471 R |
| 3,767,972 A * | 10/1973 | Noddings et al. | 361/240 |
| 4,132,284 A * | 1/1979 | Tomecek | 180/179 |
| 4,196,466 A * | 4/1980 | Noddings et al. | 361/239 |
| 4,273,208 A * | 6/1981 | Liermann | 180/179 |
| 4,286,685 A * | 9/1981 | Rudolph et al. | 180/176 |
| 4,408,293 A * | 10/1983 | Avins | 701/93 |
| 4,541,052 A * | 9/1985 | McCulloch | 701/110 |
| 5,541,843 A * | 7/1996 | Yamaguchi et al. | 701/86 |
| 6,109,130 A * | 8/2000 | Will | 74/470 |
| 6,234,269 B1 * | 5/2001 | Salzer et al. | 180/333 |
| 6,282,482 B1 * | 8/2001 | Hedstrom | 701/93 |
| 6,621,176 B1 | 9/2003 | Nagasaka et al. | |
| 6,637,534 B2 * | 10/2003 | Barbehoen et al. | 180/171 |

FOREIGN PATENT DOCUMENTS

| | | |
|---|---|---|
| AT | 004 125 | 2/2001 |
| DE | 196 45 561 | 5/1998 |
| DE | 198 50 686 | 5/2000 |
| DE | 200 03 196 | 6/2000 |
| EP | 1129885 | 9/2001 |
| JP | 2007-247852 | 9/2007 |

\* cited by examiner

*Primary Examiner*—Frank B Vanaman
(74) *Attorney, Agent, or Firm*—Walter Ottesen

(57) ABSTRACT

A method and an arrangement for the speed control of a vehicle as well an operator-controlled element are disclosed which make possible an improved acceleration and/or deceleration input by the driver of the motor vehicle. The speed control takes place in dependence upon a value for an acceleration and/or deceleration of the motor vehicle with this value being pregiven with the aid of an operator-controlled element. The function of the operator-controlled element is different from the function of an accelerator pedal and a brake pedal. With the actuation of the operator-controlled element, one of several different values for the acceleration and/or deceleration is selected and pregiven.

9 Claims, 1 Drawing Sheet

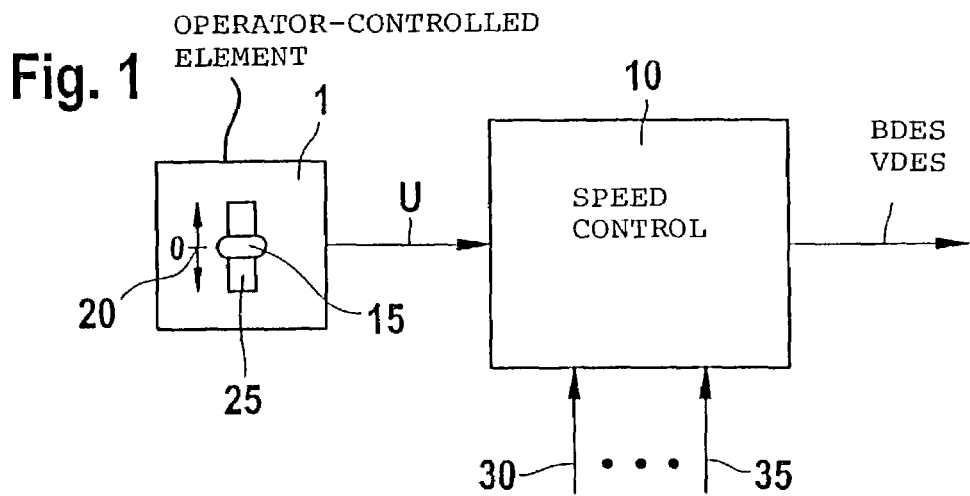
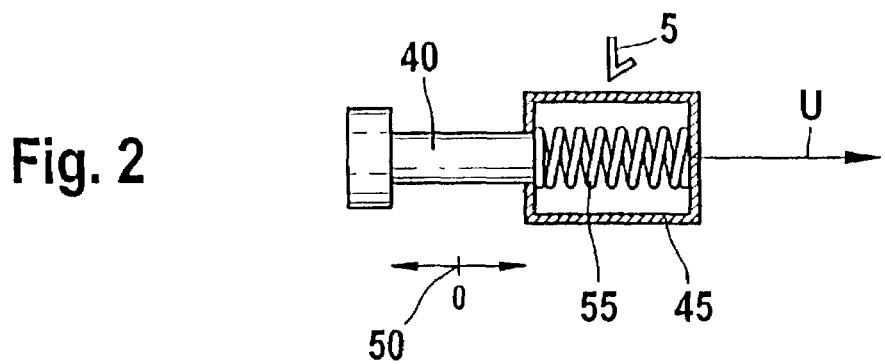
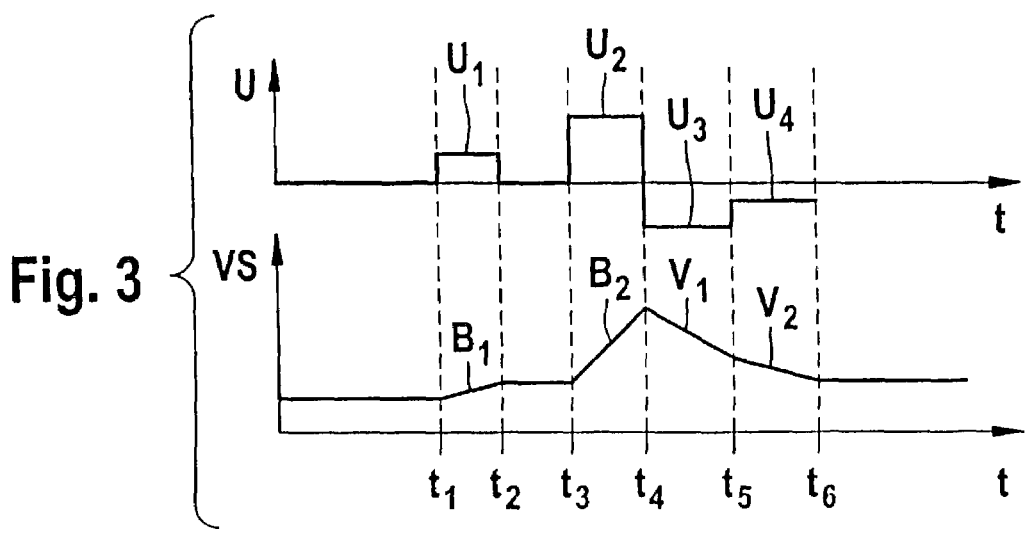

METHOD AND ARRANGEMENT FOR THE SPEED CONTROL OF A MOTOR VEHICLE AND OPERATOR-CONTROLLED ELEMENT

BACKGROUND OF THE INVENTION

German patent publication 200 03 196 already discloses a vehicle-speed control lever which makes possible the input of precisely one acceleration value in one of four possible actuating directions. In another actuating direction of this lever, precisely one value for a pregiven deceleration of the vehicle can be adjusted.

SUMMARY OF THE INVENTION

The method and arrangement of the invention for the speed control of a motor vehicle as well as of the operator-controlled element of the invention afford the advantage that one of several different values for the acceleration and/or the deceleration is selected and inputted with the actuation of the operator-controlled element. In this way, the operability of the speed control function is expanded. Furthermore, the possibility is afforded the driver of the vehicle to influence the value of the acceleration and/or deceleration via the operator-controlled element in the speed control. In this way, the driver can more comfortably match the vehicle speed to the instantaneous driving situation via the operator-controlled element. The driver of the motor vehicle can variably accelerate or decelerate independently of the accelerator pedal or the brake pedal by means of the operator-controlled element.

It is especially advantageous when an analog operator-controlled signal is formed via the actuation of the operator-controlled element which represents the pregiven value for the acceleration and/or deceleration and is supplied to the speed control. In this way, any desired values for the acceleration and/or deceleration can be inputted within pregiven limits via the operator-controlled element.

It is especially advantageous when different values for the acceleration and/or deceleration are pregiven by different deflections or different rotations of the operator-controlled element. The operator-controlled element can be especially configured in the form of a joy stick. In this way, a realization of the operator-controlled element is made possible which is known in the art and is especially simple for the driver.

BRIEF DESCRIPTION OF THE DRAWINGS

The invention will now be described with reference to the drawings wherein:

FIG. 1 is a block circuit diagram incorporating an arrangement of the invention and an operator-controlled element of the invention;

FIG. 2 is a schematic showing an alternate embodiment of the operator-controlled element of the invention; and, FIG. 3 is a signal/time diagram showing the method of the invention.

DESCRIPTION OF THE PREFERRED EMBODIMENTS OF THE INVENTION

In FIG. 1, reference numeral 10 identifies an arrangement for the speed control of a motor vehicle which, for the sake of simplicity, is referred to in the following as the speed control. An operator-controlled signal U from a first operator-controlled element 1 is supplied to the speed control 10 as an input signal. The driver of the vehicle can input a value for the acceleration and/or for the deceleration of the motor vehicle by means of the first operator-controlled element 1. The first operator-controlled element 1 can be configured as an operator-controlled part of a vehicle-speed control and can include additional input functions such as for the input of a speed to be maintained by the vehicle. These additional functions are, for example, known from German patent publication 200 03 196. In the following, however, only the input of an acceleration and/or deceleration of the vehicle by means of the first operator-controlled element 1 is considered.

The function of the first operator-controlled element 1 is furthermore to be distinguished from the function of an accelerator pedal or of a brake pedal. The first operator-controlled element is rather present in addition to the accelerator pedal and brake pedal of the vehicle and realizes a vehicle-speed control function as described in this example.

According to the invention, it is provided that one of several different values for the acceleration and/or deceleration of the motor vehicle can be selected and inputted via actuation of the first operator-controlled element 1. According to FIG. 1, this takes place in that the first operator-controlled element 1 includes a lever 15 which can be moved guided in a guide rail 25 in two directions starting from a zero position 20. The first operator-controlled element can be configured, for example, as a joy stick. Starting from the zero position 20 in the guide rail 25, if the lever 15 is deflected forwardly, then a value for the acceleration of the motor vehicle is inputted. A different deflection leads to different values for the acceleration input. Correspondingly, a deflection of the lever 15 toward the rear starting from the zero position 20 in the guide rail 25 leads to the input of a deceleration value for the motor vehicle. Here too, a different deflection leads to different values for the deceleration of the vehicle. The lever 15 can be moved continuously in the guide rail 25 and any desired values for the acceleration and/or deceleration can be selected and inputted up to a stop fixed by the upper or lower stop of the lever 15 in the guide rail 25. The value for the acceleration or deceleration which is formed in this way is then outputted to the speed control 10 via an analog operator-controlled signal U.

Alternatively, it can be provided that the lever 15 must be moved stepwise in the guide rail 25 so that only discrete values for the acceleration or deceleration of the motor vehicle can be selected and inputted. Correspondingly, the analog operator-controlled signal U then exhibits only discrete levels which represent respective inputted values for the acceleration and/or the deceleration and are supplied to the speed control 10.

In dependence upon the operator-controlled signal U (and therefore in dependence upon the value for the acceleration or deceleration of the motor vehicle selected and pregiven at the first operator-controlled element 1), the speed control 10 determines a desired acceleration value BDES in dependence upon the instantaneous driving situation. The desired acceleration value BDES is to be converted by the drive unit of the motor vehicle in order to realize the acceleration value pregiven at the first operator-controlled element 1. A deceleration, which is pregiven at the first operator-controlled element 1, is converted by the speed control 10 into a corresponding desired deceleration value VDES. The desired acceleration value BDES or the desired deceleration value VDES can be converted into corresponding requests to the torque to be outputted by the drive unit by means of an engine control (not shown in FIG. 1). Input or measurement quantities 30 to 35 are supplied to the speed control 10 to detect the instantaneous driving situation. These quantities 30 to 35 include, for example, data as to the instantaneous engine rpm and instantaneous engine load. Starting from the pregiven value for the acceleration or deceleration of the motor vehicle, which is imparted by the operator-controlled signal U, the speed control 10 can compute the desired acceleration value BDES or the desired deceleration speed VDES via an application value dependent upon the instantaneous driving situation. The application value can be stored in the form of a characteristic line or a characteristic field in the speed control 10 or in the engine control and is advantageously not changeable. The engine control is connected to the speed control 10 and can be realized therewith in a common control unit. The functions of the speed control can also be integrated into the engine control.

The formation of the analog operator-controlled signal U in dependence upon the position of the lever 15 can, for example, be realized by means of a potentiometer. Depending upon the position of the lever 15, a different potentiometer tap results and therefore a different voltage drop for forming the operator-controlled signal U. In the zero position 20 of the lever 15, the voltage of the operator-controlled signal U is equal to zero so that the speed control 10 is caused to maintain the actual vehicle speed. If the lever 15 is moved forwardly to select a pregiven acceleration value, then the voltage of the operator-controlled signal U becomes positive and a corresponding desired acceleration value BDES, which is dependent upon the actual driving situation, is formed by the speed control 10. If the lever 15 is moved to the rear, then the voltage of the operator-controlled signal U becomes negative and a corresponding desired deceleration VDES is formed by the speed control 10 in dependence upon the instantaneous driving situation. The more the lever 15 is deflected from the zero position 20 to select and input an acceleration value or deceleration value, the greater is the level of the operator-controlled signal U in magnitude and the greater, in magnitude, is the desired acceleration value BDES or desired deceleration value VDES correspondingly formed by the speed control 10. The desired deceleration value VDES can be configured as a negative desired acceleration value.

In FIG. 3, an example of a trace of the operator-controlled signal U as a function of time t is shown in dependence upon the input at the first operator-controlled element 1. Correspondingly in FIG. 3, the effect of this input on the desired speed VS as a function of time t is shown with the desired speed being pregiven to the drive unit by the engine control by means of a torque request. Up to a first time point $t_1$, the lever 15 is at the zero position 20 and the voltage of the operator-controlled signal U is equal to zero. The speed control 10 thereby outputs neither an acceleration request nor a deceleration request, that is, the desired acceleration value BDES as well as the desired deceleration value VDES are equal to zero. The instantaneously pregiven desired speed VS is therefore constant. At the first time point $t_1$, the lever 15 is moved forwardly into a first position so that a first positive voltage value $U_1$ of the operator-controlled signal U is adjusted. This position of the lever 15 and therefore the first voltage value $U_1$ are maintained up to a second time point $t_2$. This leads to the formation of a first constant desired acceleration value $B_1$ by the speed control 10 and a corresponding increase of the desired speed VS. At the second time point $t_2$, the lever 15 is again moved back into the zero position 20 and the operator-controlled signal U is again brought to zero. In this way, the desired speed VS, which is reached at the second time point $t_2$, is maintained constant up to the third time point $t_3$. At the third time point $t_3$, the lever 15 is again moved forwardly into the second position which is further deflected compared to the first position. This leads to a second voltage value $U_2$ which is likewise positive and greater than the first voltage value $U_1$. The position of the lever 15 and therefore the level of the operator-controlled signal U then remains unchanged up to a fourth time point $t_4$ and leads to the formation of a second constant desired acceleration value $B_2$ by the speed control 10 which is greater than the first desired acceleration value $B_1$ so that the desired speed VS increases more sharply from the third time point $t_3$ to the fourth time point $t_4$ than from the first time point $t_1$ to the second time point $t_2$. At the fourth time point $t_4$, the lever 15 is moved into a first position behind the zero position 20 so that the operator-controlled signal U assumes a third voltage value $U_3$ which is negative and leads to the formation of a first constant desired deceleration value $V_1$ by means of the speed control 10. Up to a fifth time point $t_5$, the position of the lever 15, and therefore the level of the third voltage value $U_3$, remains constant so that the desired speed VS, which is arrived at the fourth time point $t_4$, drops linearly up to the fifth time point $t_5$ in accordance with the first desired deceleration value $V_1$. At the fifth time point $t_5$, the lever 15 is moved in the direction toward the zero position 20 but is again stopped before reaching the zero position 20 so that a fourth voltage value $U_4$ results for the operator-controlled signal U which is likewise negative but less in magnitude than the third voltage value $U_3$. This value is maintained constant up to a sixth time point $t_6$ so that the desired speed VS drops linearly with a constant desired deceleration value $V_2$ from the fifth time point $t_5$ to the sixth time point $t_6$. This second constant desired deceleration $V_2$ is less in magnitude than the first desired deceleration value $V_1$. At the sixth time point $t_6$, the lever 15 is again brought into the zero position 20 so that, from the sixth time point $t_6$ on, the voltage of the operator-controlled signal U is zero and the desired speed VS remains at the value reached at the sixth time point $t_6$.

By using the analog operator-controlled signal U in dependence upon the position of the lever 15, different desired acceleration values BDES or desired deceleration values VDES can therefore be inputted so that the desired speed VS can be comfortably changed. With the first operator-controlled element 1, a desired acceleration or a desired deceleration can be pregiven by the driver which is converted by the speed control 10 in the manner described. In this way, the driver is provided with the possibility to more comfortably match the vehicle speed to the instantaneous driving situation via the first operator-controlled element 1. The driver then is afforded the possibility to influence the value of the desired acceleration or desired deceleration in the context of the speed control. In this way, the driver can vary the acceleration or the deceleration with the aid of the vehicle-speed operator-controlled function. Accordingly, the driver can accelerate and decelerate the vehicle with variable input values independently of the accelerator pedal and the brake pedal, respectively.

Alternatively, the first operator-controlled element 1 can be so configured that not a longitudinally displaceable lever is provided for the input of an acceleration or deceleration value, rather, an axially rotatable pin or operator-controlled rod is provided which can be rotated likewise starting from a zero position into at least two different acceleration positions or at least two different deceleration positions which characterize two different acceleration input values or two different deceleration input values.

In an alternate embodiment, FIG. 2 shows a second operator-controlled element 5 whose functionality corresponds to the functionality of the first operator-controlled element 1 but has another operator-controlled mechanism. The operator-controlled signal U is determined in dependence upon the position of the pull/press pin 40. If, starting from a second zero position 50, the pull/press pin 40 is pressed into a holding body 45, then an acceleration request is realized. If the pull/ press pin 40, starting from the second zero position 50, is pulled out of the holding body 45, then a deceleration request is effected. Depending upon how far the pull/press pin 40 is pressed into the holding body 45 starting from the second zero position 50 or is pulled out from the holding body 45, two different values for the acceleration and/or the deceleration can be selected and inputted and a corresponding operator-controlled signal U is formed. The magnitude of the pregiven acceleration or the pregiven deceleration is dependent upon in which position the pull/press pin 40 is disposed with reference to the second zero position 50 as a consequence of a press or force exertion on the part of the driver.

Here, it can be provided that the pull/press pin 40 is held in the holding body 45 in the second zero position 50 by means of a spring and, starting from the second zero position 50, is pressed into the holding body 45 against the spring force or is pulled out from the holding body 45. A release of the pull/press pin 40 by the driver then in each case leads to the situation that the pull/press pin 40 again passes into the second zero position 50. The spring mechanism is identified in FIG. 2 by reference numeral 55.

A further possibility of realizing an operator-controlled element to select and input different values for the acceleration and/or deceleration of the vehicle can be realized by a rocker switch or respective separate keys. Depending upon the time duration of the actuation of one of the keys or the rocker switch in a rocker position, a different value results for the acceleration or the deceleration and therefore a corresponding operator-controlled signal U.

The operator-controlled element can be mounted on or near the steering wheel of the vehicle.

The invention is not limited to the operator-controlled elements described but is applicable to all operator-controlled elements which make possible the selection and input of different values for the acceleration and/or deceleration. In all of these operator-controlled elements, it can be provided that the different values for the acceleration and/or deceleration can be adjusted continuously or in steps.

It can also be provided that only one operator-controlled element is provided for a variable input of different acceleration values or only one operator-controlled element is provided for the variable input of different acceleration values. It can also be provided that respective suitable operator-controlled elements are provided as in the case of the separate keys for the variable input of different acceleration value s and for the variable input of different deceleration values. In both cases, the operator-controlled elements can be configured as described above. Starting from the particular zero position, a deflection or actuation of the particular operator-controlled element is required only in one direction.

It is understood that the foregoing description is that of the preferred embodiments of the invention and that various changes and modifications may be made thereto without departing from the spirit and scope of the invention as defined in the appended claims.

What is claimed is:

1. A method for controlling the speed of a motor vehicle having a speed control and in dependence upon a pregiven value of an acceleration and/or a deceleration of said motor vehicle, the method comprising the steps of:
    supplying data including the instantaneous motor speed and/or motor load defining an instantaneous driving situation;
    providing a characteristic line or characteristic field defining an application value dependent upon said instantaneous driving situation;
    providing an operator-controlled element for inputting said value and said operator-controlled element having a function different from: that of an accelerator pedal and a brake pedal as well as of an input of a speed to be maintained by the vehicle;
    selecting and inputting, said pregiven value as one of several values for the acceleration and/or deceleration by actuating said operator-controlled element; and,
    computing a desired acceleration value and/or a desired deceleration value in dependence upon the selected and pregiven value and said application value dependent upon said instantaneous driving situation.

2. The method of claim 1, comprising the further steps of forming an analog operator-controlled signal (U) by actuating said operator-controlled element with said signal (U) representing said pregiven value for said one of said acceleration and deceleration; and, supplying said signal (U) to said speed control.

3. The method of claim 1, comprising the further step of setting discrete values for said at least one of said acceleration and deceleration by actuating said operator-controlled element.

4. The method of claim 1, wherein different values for said at least one of said acceleration and deceleration are outputted by applying a different pressure or different force at said operator-controlled element.

5. The method of claim 1, wherein different values for said at least one of said acceleration and deceleration are outputted by a different deflection or different rotation of said operator-controlled element.

6. The method of claim 5, wherein said operator-controlled element is a joystick and said joystick is actuated for selecting and inputting said value.

7. The method of claim 1, wherein said value is selected and inputted independently of said accelerator pedal and said brake pedal.

8. An arrangement for controlling the speed of a motor vehicle in dependence upon a pregiven value of an acceleration and/or deceleration of said motor vehicle, the motor vehicle having a speed control and the arrangement comprising:
    means for supplying data including the instantaneous motor speed and or motor load defining an instantaneous driving situation;
    means for providing a characteristic line or characteristic field defining an application value dependent upon said instantaneous driving situation;
    an operator-controlled element having a function different from: that of an accelerator pedal and a brake pedal as well as of an input of a speed to be maintained by the vehicle;
    said operator-controlled element including means for selecting and outputting said pregiven value from several different values for said acceleration and/or deceleration;
    means for supplying said selected and outputted value to said speed control; and,
    means for computing a desired acceleration value and/or a desired deceleration value in dependence upon the selected and pregiven value and said application value dependent upon said instantaneous driving situation.

9. The arrangement of claim 8, wherein said value is selected and inputted independently of said accelerator pedal and said brake pedal.

* * * * *

UNITED STATES PATENT AND TRADEMARK OFFICE
CERTIFICATE OF CORRECTION

PATENT NO. : 7,493,981 B2  Page 1 of 1
APPLICATION NO. : 10/429040
DATED : February 24, 2009
INVENTOR(S) : Mario Kustosch, Christian Muehlbauer and Michael Glora It is certified that error appears in the above-identified patent and that said Letters Patent is hereby corrected as shown below:

In column 6:
Line 6: delete "inputting," and insert -- inputting -- therefor.
Line 43: delete "and or" and insert -- and/or -- therefor.

Signed and Sealed this

Fourth Day of August, 2009

JOHN DOLL
*Acting Director of the United States Patent and Trademark Office*